United States Patent [19]

Rothley

[11] Patent Number: 5,797,313
[45] Date of Patent: Aug. 25, 1998

[54] ELECTRONIC BABY FORMULA PREPARATION AND STORAGE DEVICE

[76] Inventor: Tamara Rothley, 16318 Summer Dew La., Houston, Tex. 77095

[21] Appl. No.: 21,805

[22] Filed: Feb. 11, 1998

[51] Int. Cl.$^6$ .............. A47J 27/00; A47J 43/27; B01F 9/00; B01F 9/10
[52] U.S. Cl. .............. 99/483; 99/327; 99/332; 99/348; 99/486; 222/129.4; 222/145.6; 222/146.5; 222/539; 366/144; 366/146; 366/279; 366/314; 366/205
[58] Field of Search .............. 99/326–328, 331, 99/332, 348, 352–355, 452, 453, 468, 483, 486; 141/100, 104, 69, 319, 331, 340, 381; 165/61; 219/386, 689, 710; 222/146.1, 146.5, 146.2, 461, 539, 554, 129.4, 525, 133, 145.5, 145.6; 392/442, 451; 366/144–146, 279, 314, 205; 426/465, 517, 658, 523; 606/236; 215/11.1, 11.4; 206/220

[56] References Cited

U.S. PATENT DOCUMENTS

| | | | |
|---|---|---|---|
| 4,694,740 | 9/1987 | Daloz | 366/146 X |
| 5,315,084 | 5/1994 | Jensen | 219/689 |
| 5,397,031 | 3/1995 | Jensen | 222/146.5 |
| 5,419,445 | 5/1995 | Kaesemeyer | 206/220 X |
| 5,427,811 | 6/1995 | Fiusz et al. | 99/483 X |
| 5,445,195 | 8/1995 | Kim | 141/104 |
| 5,494,193 | 2/1996 | Kirschner et al. | 222/145.6 |
| 5,499,745 | 3/1996 | Derian et al. | 222/145.6 |
| 5,529,212 | 6/1996 | Terhardt | 222/145.6 X |
| 5,570,816 | 11/1996 | LaBarbera, Jr. | 99/470 X |
| 5,589,394 | 12/1996 | Kim et al. | 366/145 X |
| 5,671,325 | 9/1997 | Roberson | 392/442 |
| 5,720,552 | 2/1998 | Schindlegger | 366/314 X |

Primary Examiner—Timothy F. Simone
Attorney, Agent, or Firm—Frohwitter, Patent- und Rechtaanwälte

[57] ABSTRACT

The present invention is directed to an electrical appliance for automatically preparing a baby-feeding formulation at a prescribed hour, and for maintaining the prepared formulation at a preferred temperature for a limited period of time prior to consumption by an infant. The device may be powered by any power source for providing either alternating current or direct current.

5 Claims, 2 Drawing Sheets

ELECTRONIC BABY FORMULA PREPARATION AND STORAGE DEVICE

FIELD OF THE INVENTION

The present invention is directed to an electrical appliance for automatically preparing a baby-feeding formulation at a prescribed hour, and for maintaining the prepared formulation at a preferred temperature for a limited period of time prior to consumption by an infant. The device may be powered by any known means for providing either alternating current or direct current.

BACKGROUND OF THE INVENTION

Baby-food formulations may be prepared from a suitable volume of either liquid or powdered nutriment, mixed with a measured quantity of a carrier liquid such as water. The resulting liquid is heated to body temperature on the order of 98.6° F. for consumption by an infant through a nipple-equipped bottle. Although the formulation can be prepared in a number of ways, it is convenient to prepare the beverage directly in a dispensing bottle using a bottle warmer.

One such device is described in U.S. Pat. No. 5,397,031, issued Mar. 14, 1995 to M. T. Jensen. In Jensen, the bottle warmer includes a housing of water and a heater for heating selected amounts of water. A flexible tube is provided for interconnecting the bottle and the heater, and a metering valve is disposed between the bottle and the heater to allow one of the selected amounts of water to enter the heater. A sensor is provided and disposed within the flexible tube upstream from the metering valve for sensing the temperature of the water entering the metering valve. A control system, responsive to a manual switch for designating one of the selected amounts of water, is provided for running the heater for a sufficient time to warm one of the selected amounts of water to a selected temperature. It is to be noted that the formula (see Jenson FIG. 1, item 50) reposes at the bottom of the bottle (item 42), but that no means is provided for mixing the water and the formula together.

U.S. Pat. No. 5,419,445, issued May 30, 1995 to D. M. Kaesemeyer, teaches a dispensing bottle having two separate compartments, one for water and one for baby formula. The water and formula can be released by turning a nipple assembly whereupon a seal is unlatched such that the water and formula are delivered into the bottle, and which then may be mixed by manually shaking the bottle.

In powdered formula applications, experimentation by the inventor has surprisingly revealed that unless the baby-formula powder is agitated vigorously at the same time the water is being added, the powder solidifies into a semi-congealed mass that is useless for baby-feeding.

Newborn babies require feeding in accordance with schedules that are not necessarily coincident with adult time-schedules. All of the devices previously known to those of skill in the art require extensive active participation by an operator at the time the baby-feeding formulation is prepared, for example often requiring a parent to arise from bed at an inconvenient hour.

Accordingly, there is a need for a baby-formula brewing device which, at a selected time, will automatically prepare, mix, warm and maintain the temperature of the contents of a baby feeding bottle without the active participation of a care-giver. The parents' responsibility is reduced to merely presenting the prepared bottle to the infant. Preferably, the claimed device is operable from either alternating house current or DC battery power.

SUMMARY OF THE INVENTION

The claimed baby-formula brewing device comprises a housing for securely receiving and supporting a baby-feeding bottle. A reservoir is mounted on the housing for storing a measured volume of water and is in fluid communication with the bottle. A timer means releases the volume of water into the bottle at a preselected time during a baby-feeding cycle. Simultaneously with the release of the water from the reservoir, a mixing means, operatively associated with the bottle, is activated to agitate the water with a volume of formula that was previously inserted into the bottle. A heating means, under the control of a temperature sensor, warms the formula mixture to a desired temperature and maintains the formula mixture at that temperature for a preselected period of time.

BRIEF DESCRIPTION OF THE DRAWINGS

Referring now to the accompanying drawing sheets.

DETAILED DESCRIPTION OF THE INVENTION

Figure 1:
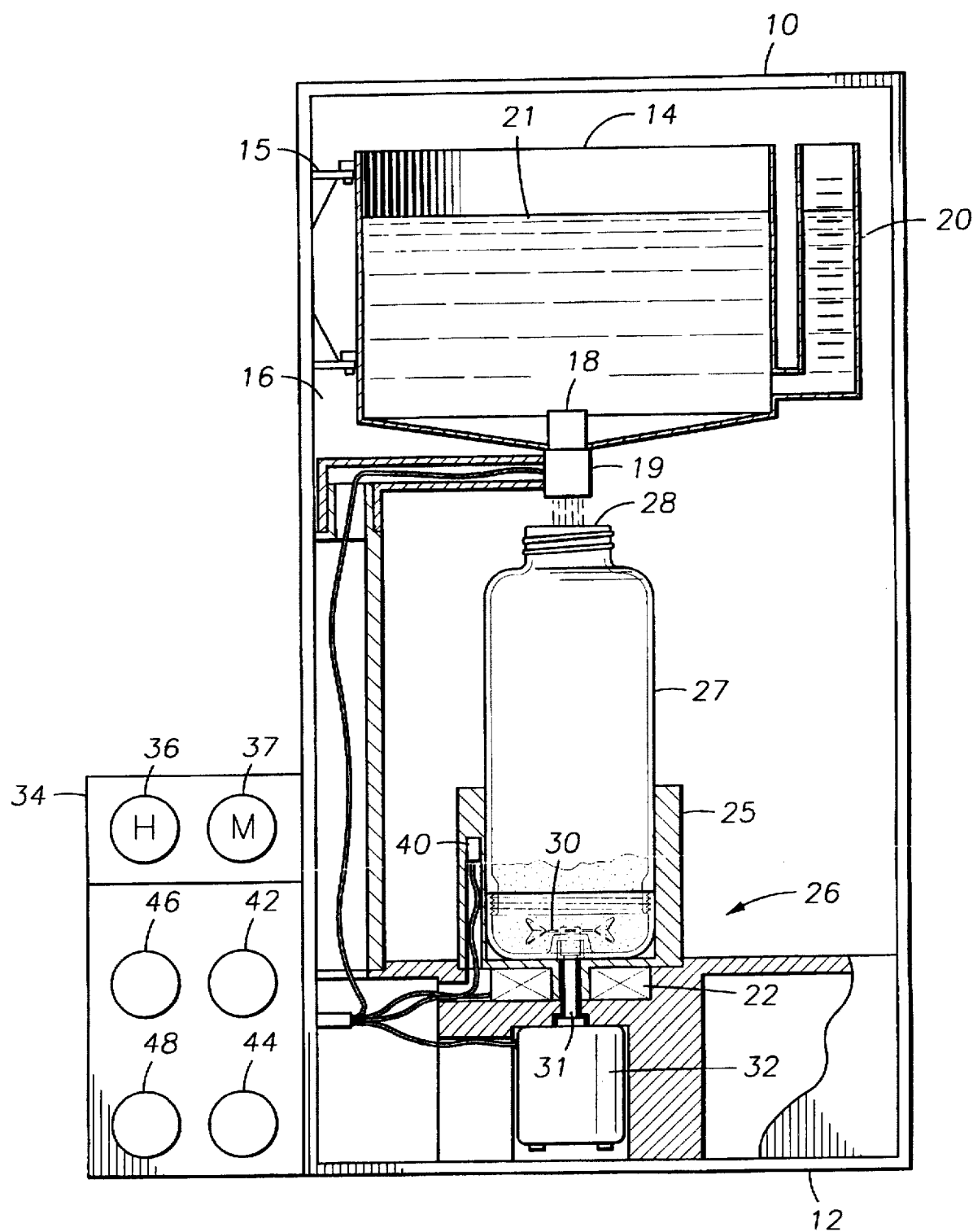
FIG. 1 is an overall view of a baby formula brewing device according to an aspect of the present invention.

Referring now to FIG. 1, there is shown the essential components of the present invention, comprising a housing 10 having a base 12. A liquid reservoir 14 for containing a volume of water or other fluid is mounted at the upper end of housing 10. Reservoir 14 is mounted from brackets such as 14 and 15 and may include a cover (not shown) and/or a liquid-exit port 18 that is normally closed by an electrically operable valve 19 of any known variety. A hollow, graduated sight glass 20, in fluid communication with the liquid contents 21 of reservoir 14, is mounted on one side of the reservoir for monitoring the liquid level therein. In a particularly preferred embodiment, the sight glass 20 is calibrated with a graduated scale, for example, indicating multiples of four, six and eight ounces, the usual capacities of baby-feeding bottles (hereinafter referred to simply as "a bottle" for brevity). The reservoir 14 is detachable from brackets 15 and 16 for cleaning and sterilization. The height of the lower end of valve 19 should be sufficient to clear the tallest bottle likely to be used.

The base 12 of housing 10 includes a cup 25 of a suitable shape and size to receive and hold a bottle 27 during formula preparation. The cup 25 is preferably mounted on a low platform 26 that includes a thermostatically-controlled electrical heating element 22 therebeneath for heating the contents of bottle 27. The cup 25 is positioned on the platform 26 such that the mouth 28 of bottle 27 is centered under the valve 19.

A mixing means, next to be described, is operatively associated with the bottle 27 so that simultaneously with the release of liquid from reservoir 14, through valve 19 and into bottle 27, the liquid residing therein will be agitated to blend the formula with the water, thereby preventing congealing or hardening.

The mixing means may be, for example, of a blender-type, with a shaft-mounted impeller 30 sealed through a passageway in the bottom of the bottle 27 in the manner of a conventional blender such as the well-known Waring blender used to prepare juices formulations and the like. The impeller assembly, including a plurality of suitable seals, is inserted through a hole in the bottom of the bottle with the impeller shaft projecting below. A snap ring holds the impeller assembly in place. A socket in the impeller shaft engages a stub shaft 31 of a miniature motor 32 mounted on base 12 beneath cup 25, said stub shaft in turn rotating the impeller 30. Alternatively, a magnetic stirrer could be used, thus obviating the need for a specially manufactured bottle.

An electric control/timer module 34 of any desired typed is provided. Module 34 may be of a type similar to the control console of appliances such as microwave ovens and the like. Module 34, including a digital clock having hour and minute dials 36 and 37, respectively, is provided for selecting the time for automatically starting preparation of the baby's bottle. At the selected time, module 34 actuates a switch (not shown in FIG. 1) to turn on heater 22 to high heat for warming the bottle ab initio. When the bottle 27 reaches a desired temperature, a thermostat 40, operatively associated with bottle 27 causes heating element 22 to reduce the heat to a level sufficient to maintain the temperature of the bottle and its contents over a limited period. If the bottle 27 is not presented to the infant within the preselected time period, the heater is disabled because the contents of the bottle then become stale and unfit for infant consumption.

Audio/visual signal devices 42 and 44, operatively coupled to the thermostat, signals the readiness status of the bottle and its contents. One suitable signaling device might be a LED in combination with a Piezo Buzzer as is provided, for example, by Radio Shack under catalog order no. 273–068. The usual ON and OFF controls 46 and 48 are provided.

The timer and controls may be built directly into the housing 10, or an alternative, external timer such as the dual-memory timer/clock, catalog order no. 363–884 provided by Radio Shack, can be used. Preferably, the bottle warmer/mixer is adapted to be powered by either rechargeable DC batteries or by house current.

In operation, preliminary preparation requires a measured amount of baby-feeding formula be initially placed into the bottle 27, the bottle 27 then being placed in the holding cup 25. A volume of water in proportion to the capacity of the bottle, is poured into reservoir 14. The clock 36/37 is set to the desired turn-on time. At the selected time, control module 34 turns on heater element 22 and opens valve 19. Simultaneously, stirring means 30 is also turned on so that as the water flows into bottle 27 through exit port 18 and valve 19, the formula (represented schematically in FIG. 1 as a plurality of dots) is vigorously mixed with incoming water to prevent congealing.

Once the contents of the bottle have reached the desired temperature, thermostat 40 actuates a relay (not shown in FIG. 1) to cause heater 22 to reduce its heat output to a temperature maintenance setting for a limited period of time, for example, two to four hours. At the same time, the audio/visual device signals that the bottle is ready for presentation to the infant. The mixer continues to operate until the device is manually turned off or until the end of the time-out period, whichever occurs first, so that the formula ingredients will not settle prior to consumption. In a particularly preferred embodiment, the mixed solution is intermittently remixed.

Figure 2:
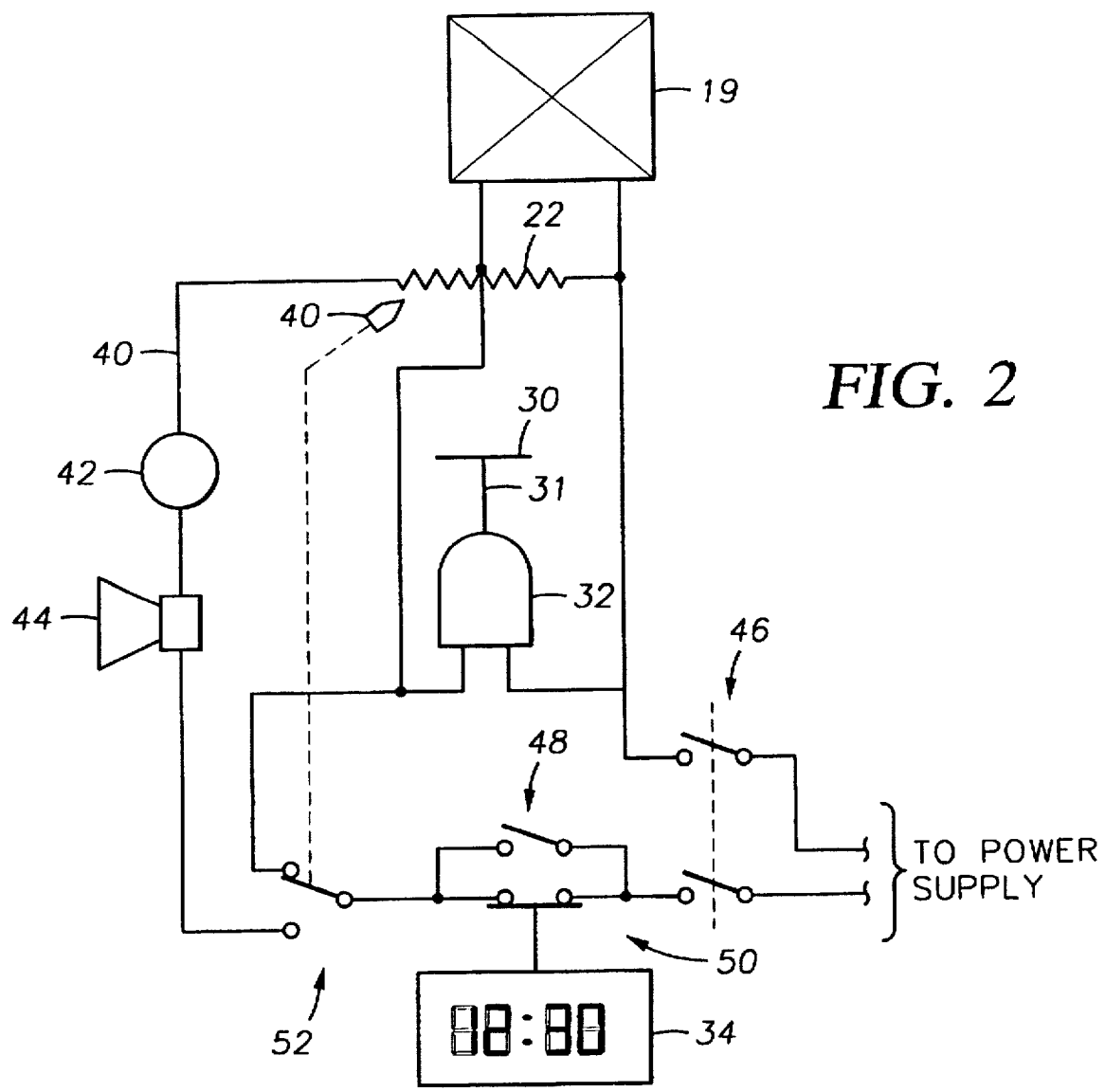
FIG. 2 is a schematic wiring diagram of a baby formula brewing device according to an aspect of the present invention.

FIG. 2 is a schematic electrical diagram of a presently preferred mode of operation. As previously mentioned, electrical power from any desired power source is applied to terminals PWR in a conventional manner. ON/OFF switch 50 is preferably actuated by the timer in control module 34. Relay 52 engages the upper contact, switching on the high-temperature winding of heater 22. At the same time, valve 19 is opened to drain water from reservoir 14 into bottle 27. Simultaneously, motor 32 causes impeller 30 to agitate the incoming water, thus mixing the water and the formula together. When the mixture reaches the desired temperature, thermostat 40 actuates relay 52 to the lower contact, thus switching on the maintenance-temperature winding of heater 22 and concurrently turning on audio/visual signaling means 42 and 44 to indicate the system temperature status, that is, when the bottle is ready for use. Timer 34 shuts off the device at the end of the time-out period, or it can be manually over-ridden if desired.

The disclosed invention has been described with a certain degree of specificity by way of example but not by way of limitation. Those skilled in the art will devise many obvious variations to the examples given herein which will fall within the scope and spirit of the invention. The invention was described in terms of a bottle being gravity-filled from a reservoir positioned above. Alternatively, an adaptation of the plumbing of a drip-style coffee maker could be used.

I claim:

1. An electronic baby-formula preparation and storage device, comprising:

a housing having a base;

a formula dispensing bottle;

a support means mounted on said base for supporting said formula dispensing bottle;

a reservoir, supported by said housing and in fluid communication with said formula dispensing bottle, for containing a volume of liquid;

a transfer means, controlled by a timer, for transferring said volume of liquid from said reservoir into said formula dispensing bottle;

an agitating means, operatively associated with said timer and said formula dispensing bottle, for agitating said liquid simultaneously with the transfer of said liquid from said reservoir into said formula dispensing bottle; and a warming means, operatively associated with said timer, for warming said transferred liquid to a preselected temperature.

2. The electronic baby-formula preparation and storage device of claim 1, further comprising:

a temperature maintenance means, for maintaining said transferred liquid at a constant temperature for a limited time period.

3. The electronic baby-formula preparation and storage device of claim 1, further comprising:

a sight glass in fluid communication with said reservoir for monitoring the volume of liquid resident therein.

4. The electronic baby-formula preparation and storage device of claim 1, wherein:

said warming means and said mixing means are electrically powered.

5. The electronic baby-formula preparation and storage device of claim 1, further comprising:

a signalling means for signalling the readiness status of said transferred liquid.

* * * * *